(12) United States Patent  
Joo et al.

(10) Patent No.: US 8,601,200 B2  
(45) Date of Patent: Dec. 3, 2013

(54) CONTROLLER FOR SOLID STATE DISK WHICH CONTROLS ACCESS TO MEMORY BANK

(75) Inventors: Yongsik Joo, Seongnam-si (KR); Hyunmo Chung, Seongnam-si (KR)

(73) Assignee: OCZ Technology Group Inc., San Jose, CA (US)

( * ) Notice: Subject to any disclaimer, the term of this patent is extended or adjusted under 35 U.S.C. 154(b) by 246 days.

(21) Appl. No.: 13/128,981

(22) PCT Filed: Oct. 30, 2009

(86) PCT No.: PCT/KR2009/006337  
§ 371 (c)(1),  
(2), (4) Date: Jul. 26, 2011

(87) PCT Pub. No.: WO2010/056003  
PCT Pub. Date: May 20, 2010

(65) Prior Publication Data  
US 2011/0276740 A1  Nov. 10, 2011

(30) Foreign Application Priority Data  
Nov. 13, 2008  (KR) .................. 10-2008-0112575

(51) Int. Cl.  
*G06F 13/16* (2006.01)  
*G06F 12/10* (2006.01)

(52) U.S. Cl.  
USPC .. 711/5; 711/103; 711/E12.008; 711/E12.033

(58) Field of Classification Search  
USPC .............. 711/5, 103, 157, E12.008, E12.019, 711/E12.033  
See application file for complete search history.

(56) References Cited

U.S. PATENT DOCUMENTS

| 7,013,376 | B2 | 3/2006 | Hooper, III | |
|---|---|---|---|---|
| 7,114,051 | B2 | 9/2006 | Guu et al. | |
| 2003/0163654 | A1* | 8/2003 | Louzoun et al. | 711/154 |
| 2005/0057999 | A1* | 3/2005 | Kobayashi et al. | 365/222 |
| 2005/0114589 | A1* | 5/2005 | Lofgren et al. | 711/103 |
| 2005/0132146 | A1* | 6/2005 | Kim et al. | 711/151 |
| 2006/0152981 | A1 | 7/2006 | Ryu | |

(Continued)

FOREIGN PATENT DOCUMENTS

| KR | 10-2001-0060974 A | 7/2001 |
|---|---|---|
| KR | 10-2002-0050163 A | 6/2002 |

(Continued)

OTHER PUBLICATIONS

International Search Report in International Application No. PCT/KR2009/006337, filed Oct. 30, 2009.

(Continued)

*Primary Examiner* — Hal Schnee  
(74) *Attorney, Agent, or Firm* — Hartman Global IP Law; Gary M. Hartman; Domenica N. S. Hartman

(57) ABSTRACT

A controller for a solid state disk is provided. The controller includes a storage module to store an index of at least one idle bank among a plurality of memory banks, and a control module to control an access to the at least one idle bank using the stored index. Here, the access to the at least one idle bank may be controlled based on a state of a channel corresponding to each of the at least one idle bank.

17 Claims, 5 Drawing Sheets

(56) References Cited

U.S. PATENT DOCUMENTS

| | | |
|---|---|---|
| 2006/0179213 A1* | 8/2006 | Brittain et al. ............... 711/105 |
| 2006/0271724 A1* | 11/2006 | Purcell et al. .................... 711/5 |
| 2007/0153576 A1* | 7/2007 | Oh et al. ................. 365/185.11 |
| 2007/0156946 A1* | 7/2007 | Lakshmanamurthy et al. .. 711/5 |
| 2008/0162790 A1* | 7/2008 | Im ............................... 711/103 |
| 2008/0209161 A1 | 8/2008 | Yun et al. |
| 2009/0113112 A1* | 4/2009 | Ye et al. ........................ 711/102 |
| 2009/0150624 A1* | 6/2009 | Resnick ........................ 711/155 |
| 2009/0292865 A1 | 11/2009 | Hong |

FOREIGN PATENT DOCUMENTS

| | | |
|---|---|---|
| KR | 10-2003-0093079 A | 12/2003 |
| KR | 10-2008-0078129 A | 8/2008 |
| WO | WO-00/28418 A1 | 5/2000 |
| WO | WO-2005/098623 A2 | 10/2005 |

OTHER PUBLICATIONS

Kang, J.U. et al. "A multi-channel architecture for high-performance NAND flash-based storage system" *Journal of Systems Architecture*, Sep. 2007, 53(9):644-658.

Chang, Y.B. et al. "A Self-Balancing Striping Scheme for NAND-Flash Storage Systems" *Symposium on Applied Computing 2008*, Mar. 16, 2008, 1715-1719.

Supplementary European Search Report dated Oct. 18, 2012 in European Application No. 09826235.5, filed Oct. 30, 2009.

* cited by examiner

CONTROLLER FOR SOLID STATE DISK WHICH CONTROLS ACCESS TO MEMORY BANK

TECHNICAL FIELD

Embodiments of the present invention relate to a controller for a solid state disk, and more particularly, to a technology for efficiently selecting memory banks targeted for a read operation or write operation in a solid state disk having a plurality of memory banks.

BACKGROUND ART

Recently, interest in solid state disks is greatly increasing. A solid state disk uses a flash memory, a Synchronous Dynamic Random Access Memory (SDRAM) and the like, instead of a hard disk drive. Accordingly, since a mechanical driving device such as a motor used for a hard disk drive is not required in the solid state disk, the solid state disk may be operated without almost generating heat and noise. In addition, the solid state disk may be robust to external shocks, and may achieve a high data transmission rate, compared to the hard disk drive.

The solid state disk includes a plurality of memory banks, and a controller needs to select at least one of the plurality of memory banks to perform a read operation or a write operation. A general solid state disk selects at least one of a plurality of memory banks using firmware including a wear leveling algorithm that enables the plurality of memory banks to be almost evenly worn. However, when at least one memory bank is selected using the firmware, an operation of a Central Processing Unit (CPU) may be required, thereby causing various problems, such as a time delay.

Additionally, a plurality of memory banks are connected to a plurality of channels. For example, a four-channel solid state disk includes four channels, and a plurality of memory banks are connected to each of the four channels. Here, selecting a memory bank based on only states of memory banks, instead of based on a state of a channel connected to the selected memory bank may create a problem. In other words, when the channel connected to the selected memory bank is in a busy state, there is a need to wait until the channel enters an idle state to perform a read operation or a write operation with respect to the selected memory bank. Such waiting may cause a reduction in an overall performance of a solid state disk.

DETAILED DESCRIPTION OF INVENTION

Technical Goals

A controller for a solid state disk according to an embodiment of the present invention may reduce a delay due to a use of firmware by separately managing an index of an idle bank through a storage module (for example, a register) that is a hardware medium to select a memory bank.

Additionally, a controller for a solid state disk according to an embodiment of the present invention may perform a read operation or a write operation without waiting caused by a busy state of a channel, by selecting at least one idle bank based on a state of a channel.

Furthermore, a controller for a solid state disk according to an embodiment of the present invention may apply a wear leveling using a round-robin scheme.

Moreover, a controller for a solid state disk according to an embodiment of the present invention may easily select one of a plurality of idle banks by using a pointer.

In addition, a controller for a solid state disk according to an embodiment of the present invention may provide a Flash Translation Layer (FTL) with information on a selected idle bank, and thus the FTL may more efficiently form or update a map between a physical sector and a logical sector.

Technical Solutions

According to an aspect of the present invention, there is provided a controller for a solid state disk, including: a storage module to store an index of at least one idle bank among a plurality of memory banks; and a control module to control an access to the at least one idle bank using the stored index.

Here, the control module may control the access to the at least one idle bank, based on a state of a channel that corresponds to each of the at least one idle bank. Additionally, the control module may indicate one of the stored index using a pointer, and may control an access to an idle bank corresponding to the indicated index.

In particular, a result of the access to the at least one idle bank may be provided to a Flash Translation Layer (FTL), and the FTL may form a map between a physical sector and a logical sector based on the result of the access.

According to another aspect of the present invention, there is provided a control method for a solid state disk, including: storing, in a prepared register, an index of at least one idle bank among a plurality of memory banks; detecting at least one index from the prepared register; and controlling an access to the at least one idle bank using the detected at least one index.

Effect of the Invention

According to embodiments of the present invention, a controller for a solid state disk may reduce a delay due to a use of firmware by separately managing an index of an idle bank through a storage module that is a hardware medium to select a memory bank.

Additionally, according to embodiments of the present invention, a controller for a solid state disk may perform a read operation or a write operation without waiting caused by a busy state of a channel, by selecting at least one idle bank based on a state of a channel.

Furthermore, according to embodiments of the present invention, a controller for a solid state disk may apply a wear leveling using a round-robin scheme.

Moreover, according to embodiments of the present invention, a controller for a solid state disk may easily select one of a plurality of idle banks by using a pointer.

In addition, according to embodiments of the present invention, a controller for a solid state disk may provide a Flash Translation Layer (FTL) with information on a selected idle bank, and thus the FTL may more efficiently form or update a map between a physical sector and a logical sector.

BRIEF DESCRIPTION OF DRAWINGS

These and/or other aspects, features, and advantages of the invention will become apparent and more readily appreciated from the following description of exemplary embodiments, taken in conjunction with the accompanying drawings of which.

BEST MODE FOR CARRYING OUT THE INVENTION

Figure 1:
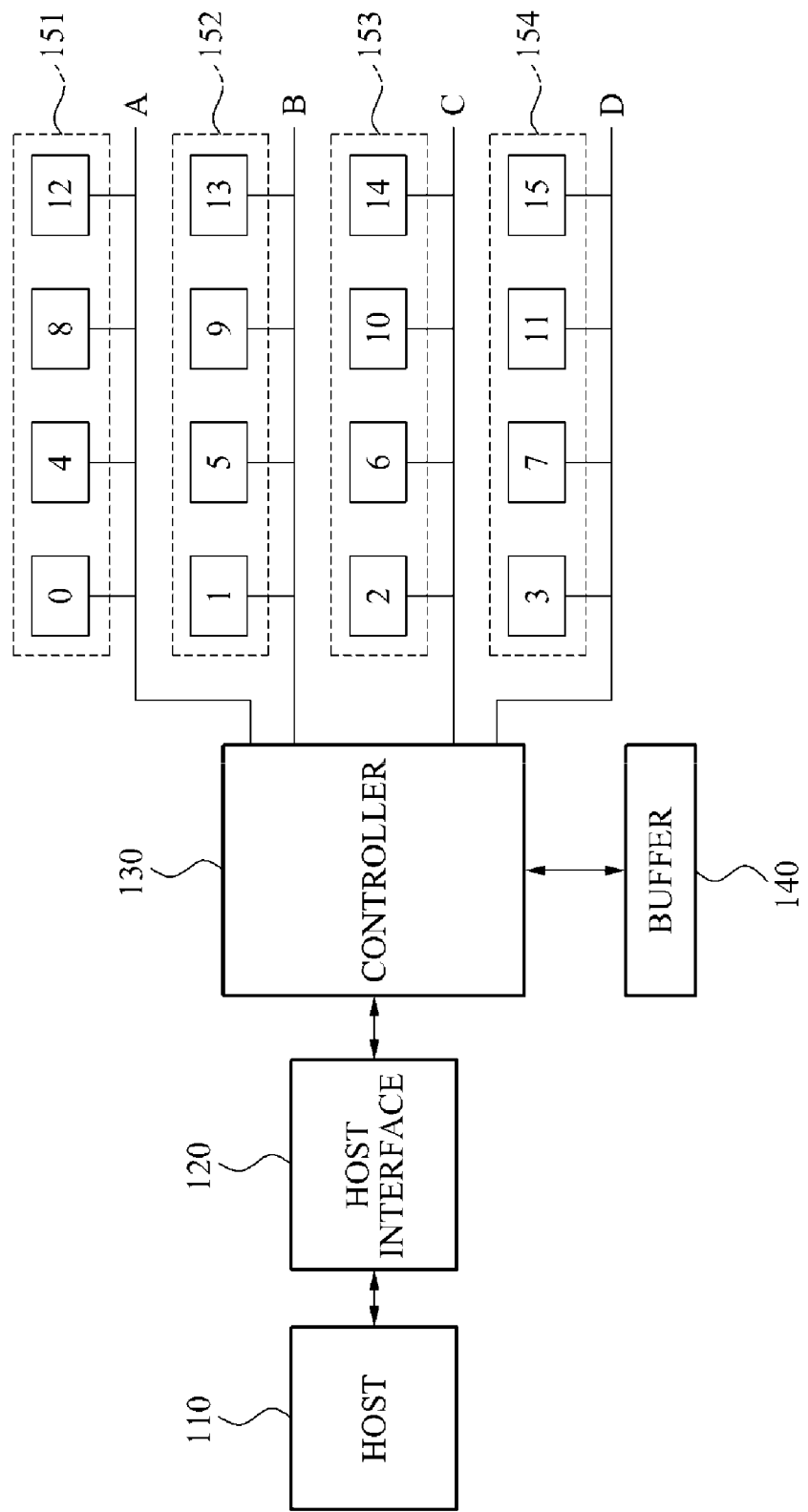
FIG. 1 is a diagram illustrating a solid state disk according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a solid state disk according to an embodiment of the present invention.

Referring to FIG. 1, the solid state disk may include a host interface 120, a controller 130, a buffer 140, and a plurality of memory banks 151, 152, 153, and 154.

The host interface 120 may transmit or receive, via a bus to or from an external host 110, various signals such as a control signal, address information, data and the like. The host interface 120 may appropriately convert, to internal signals, the various signals transmitted or received to or from the external host 110, and may provide the controller 130 with the internal signals.

Additionally, the controller 130 may control a read operation or a write operation with respect to the plurality of memory banks 151, 152, 153, and 154, in response to the internal signals from the host interface 120. Here, a flash memory may be installed in each of the plurality of memory banks 151, 152, 153, and 154. Additionally, the plurality of memory banks 151, 152, 153, and 154 may be connected to a plurality of channels (channels A, B, C, and D) that are independent with each other.

Additionally, the buffer 140 may store frequently used data. In order to reduce a time required for the read operation or the write operation, the controller 130 may store the frequently used data in the buffer 140.

The plurality of channels (channels A, B, C, and D) may be independently operated. Accordingly, the solid state disk according to the embodiment of the present invention may perform, in parallel, the read operation or the write operation using the plurality of channels (channels A, B, C, and D). In other words, the controller 130 may the read operation or the write operation, independently, with respect to memory banks 0, 4, 8, and 12 connected to the channel A, memory banks 1, 5, 9, and 13 connected to the channel B, memory banks 2, 6, 10, and 14 connected to the channel C, and memory banks 3, 7, 11, and 15 connected to the channel D.

Here, assuming that the memory banks 0, 1, 2, 3, 4, 5, and 6 are in an idle state, the channels A and B are in a busy state, and the channel C are in an idle state. there is a need to wait until the channels A and B enter the idle state in order to perform the read operation or the write operation with respect to at least one of the memory banks 0, 1, 4, and 5 connected to the channel A or B. Such waiting may cause a reduction in an overall performance of the solid state disk. However, the controller 130 may recognize that the channel C is in the idle state, may select the memory bank 2 or 6 connected to the channel C from among the memory banks 0, 1, 2, 3, 4, 5, and 6, and may quickly perform the read operation or the write operation with respect to at least one of the selected memory banks 2 and 6. This operation will be further described with reference to FIGS. 2 through 6.

Figure 2:
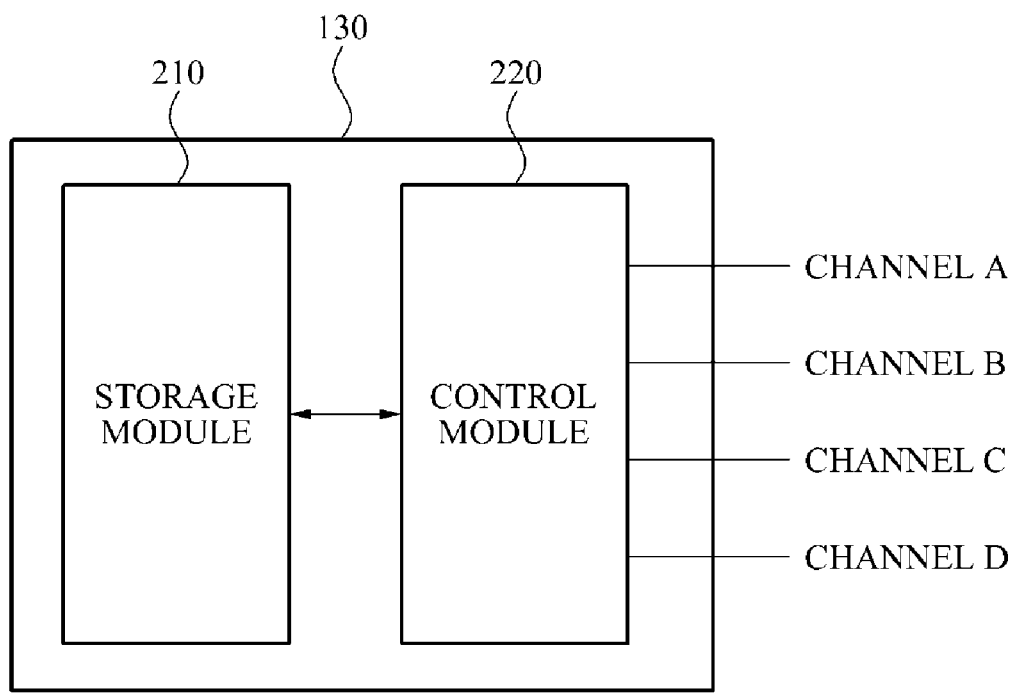
FIG. 2 is a block diagram illustrating a controller for a solid state disk according to an embodiment of the present invention.

FIG. 2 is a block diagram illustrating a controller for a solid state disk according to an embodiment of the present invention.

Referring to FIG. 2, a controller 130 for a solid state disk according to an embodiment of the present invention may include a storage module 210, and a control module 220. Here, the control module 220 may control a read operation or a write operation with respect to a plurality of memory banks (not shown) through channels A, B, C, and D. While four channels are shown in FIG. 2, there is a need to note that the present invention may also be applied to various cases in which at least two channels exist.

The storage module 210 may store and manage indexes of idle banks among the plurality of memory banks. In particular, the storage module 210 may form a list of the indexes of the idle banks using a register. Here, the indexes stored in the storage module 210 may be appropriately updated in response to a change of states of the idle banks to the busy state.

Additionally, the control module 220 may control an access to a selected idle bank using the indexes stored in the storage module 210. In other words, the control module 220 may select an idle bank targeted for the read operation or the write operation, based on the stored indexes, and may control the access to the selected idle bank.

In particular, the control module 220 may select at least one idle bank based on a state of a channel that is connected to each of the idle banks, in order to reduce the above-described waiting time.

For example, when the channel B is in the idle state among the channels A, B, C, and D, the control module 220 may preferentially select an idle bank connected to the channel B from among various idle banks.

Additionally, the control module 220 may use a round-robin scheme for wear leveling, so that the plurality of memory banks may be evenly used. For example, the control module 220 may sequentially select memory banks connected to a single channel, so that the plurality of memory banks may be evenly used.

In addition, information on the selected idle bank (access result) may be provided to a Flash Translation Layer (FTL). Here, the FTL may form or update a map between a physical sector and a logical sector, based on the information on the selected idle bank (access result).

Figure 3:
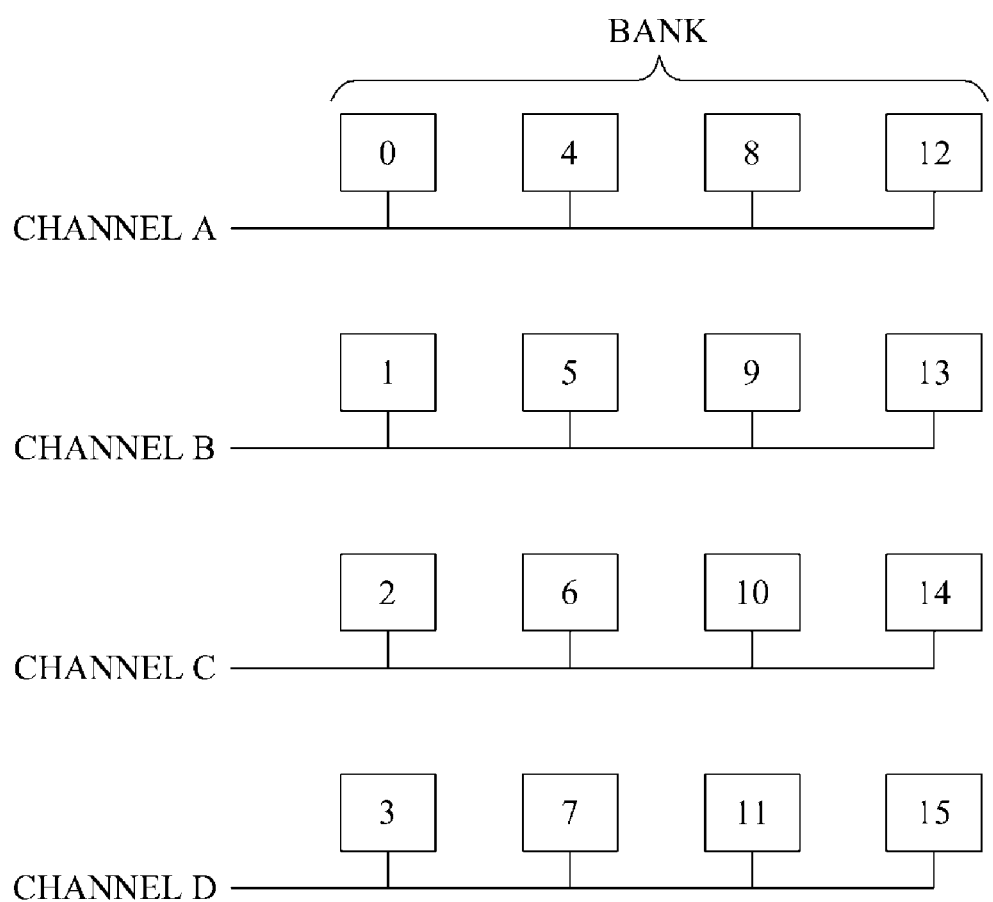
FIG. 3 is a diagram illustrating a plurality of memory blocks connected to each of a plurality of channels according to an embodiment of the present invention.

FIG. 3 is a diagram illustrating a plurality of memory blocks connected to each of a plurality of channels according to an embodiment of the present invention.

Referring to FIG. 3, four memory banks may be connected to each of four channels. Here, all of 16 memory banks are assumed to be initialized to the idle state. Accordingly, all of the 16 memory banks may be idle banks, and thus indexes of all of the 16 memory banks may be stored in a storage module.

Here, a controller according to an embodiment of the present invention may select a memory bank 0 at an initial stage, and may sequentially select memory banks 1, 2, and 3. Additionally, when an index of a memory bank 4 is searched for, and when the channel A connected to the memory bank 4 is in the busy state, the controller may select a memory bank 5 connected to a channel B in the idle state, instead of the memory bank 4.

Accordingly, the controller may select the memory bank 5 connected to the channel B, directly, without waiting until the state of the channel A is changed from the busy state to the idle state and thus, it is possible to improve a performance of the solid state disk.

In addition, it is assumed that all of channels A, B, C, and D are in the busy state, and that memory banks 6, 7, 9, 13, 14, and 15 are in the idle state. Here, when the channel C enters the idle state first among the channels A, B, C, and D, the controller may select one of the memory banks 6 and 14. Furthermore, the controller may select a memory bank with a high priority from both the memory banks 6 and 14, based on the round-robin scheme.

Due to the above-described operation of selecting the memory bank, there is a need to change the map between the physical sector and the logical sector that is managed in the FTL. Here, a result of the above-described operation of selecting the memory bank may be provided to the FTL and thus, it is possible to appropriately form or update the map.

Figure 4:
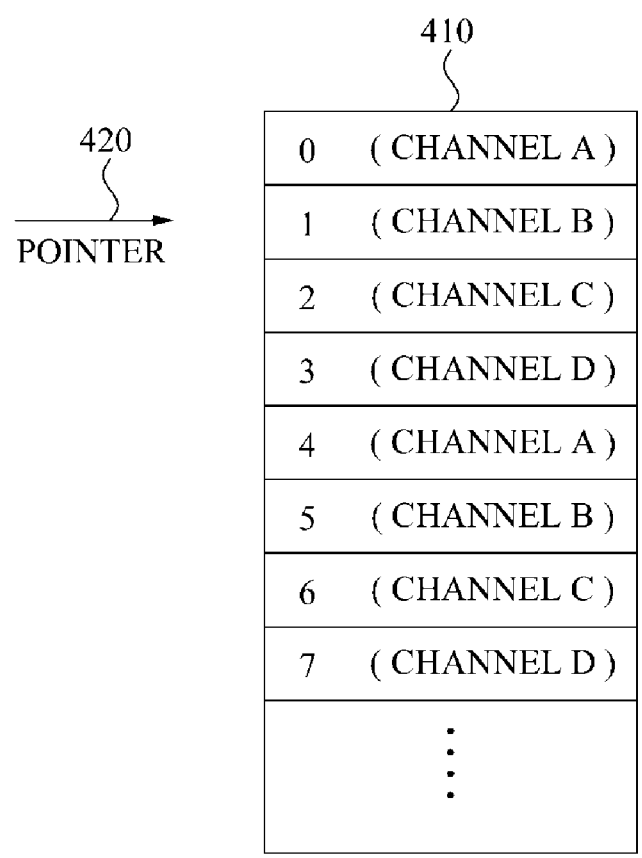
FIG. 4 is a diagram illustrating a table managed by a storage module according to an embodiment of the present invention.

FIG. 4 is a diagram illustrating a table managed by a storage module according to an embodiment of the present invention.

Referring to FIG. 4, the storage module according to the embodiment of the present invention may manage a table 410 that stores indexes of memory banks, or indexes of idle banks, namely, memory banks in the idle state. Numerals 1, 2, 3, . . . , and 7 in the table 410 may represent indexes of memory banks or indexes of idle banks.

A pointer 420 may indicate one of the plurality of indexes stored in the table 410. Here, a controller may select an idle bank corresponding to the indicated index, and may perform a read operation or a write operation with respect to the selected idle bank.

When a state of an idle bank is changed to a busy state, or when the pointer 420 selects a single idle bank, the table 410 may be updated, or alternatively the pointer 420 may newly indicate an index other than an index that is currently indicated by the pointer 420.

For example, the pointer 420 may change indexes that are sequentially indicated using the round-robin scheme. In other words, the pointer 420 may repeat an operation of currently indicating a (k+1)-th index immediately after indicating a k-th index.

Additionally, the pointer 420 may indicate an index of an idle bank based on a state of a channel. For example, when the channel A is in the busy state, the pointer 420 may skip the index 4, and may newly indicate the index 5, immediately after indicating the index 3.

As a result, a controller according to an embodiment of the present invention may quickly select an idle bank targeted for a read operation or a write operation, using the pointer 420 that indicates a single index based on a state of a channel.

Figure 5:
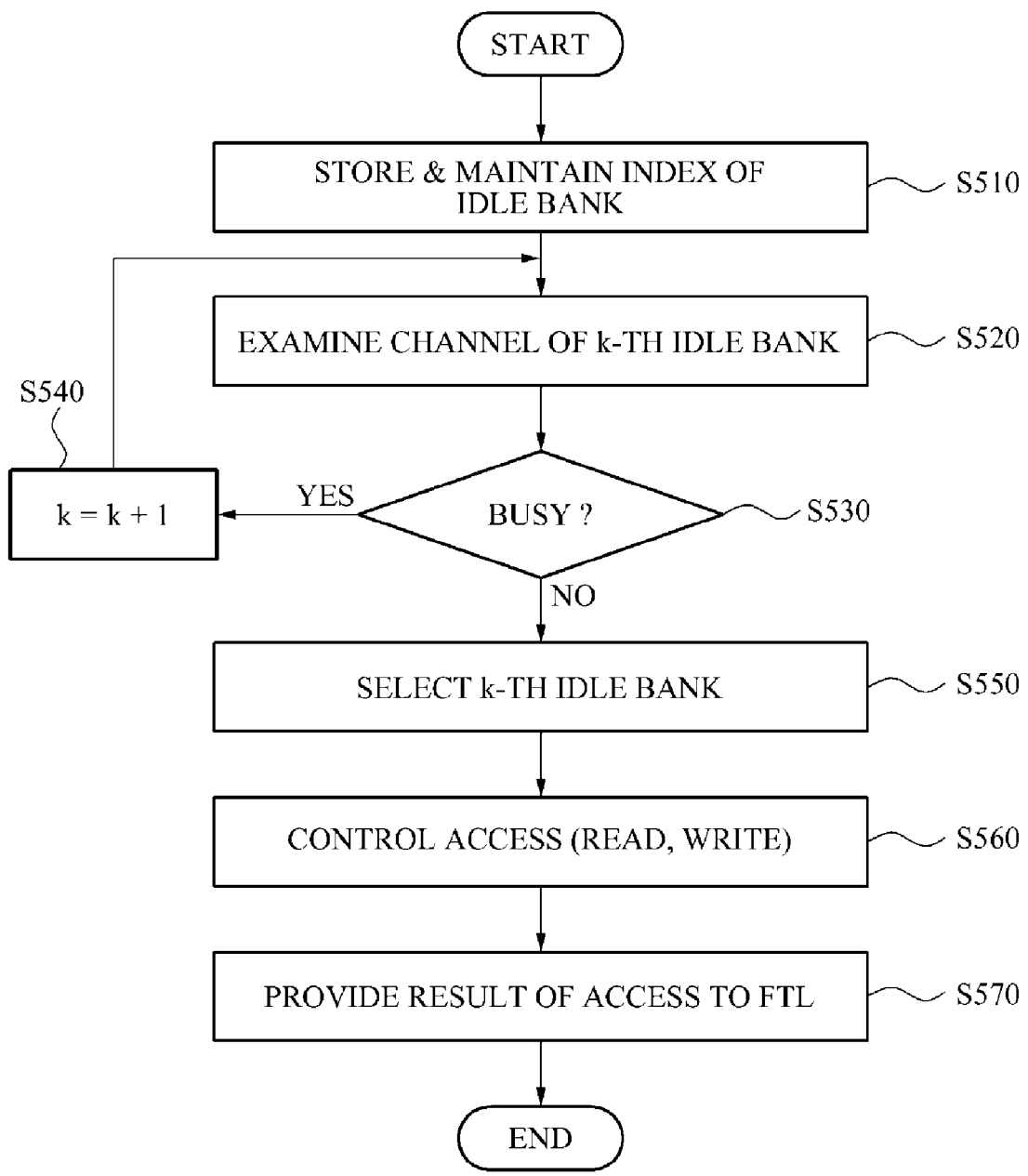
FIG. 5 is a flowchart illustrating a control method for a solid state disk according to an embodiment of the present invention.

FIG. 5 is a flowchart illustrating a control method for a solid state disk according to an embodiment of the present invention solid state disk.

Referring to FIG. 5, in the control method, an index of at least one idle bank among a plurality of memory banks may be stored in a prepared register (S510).

Additionally, in the control method, a channel corresponding to an idle bank with a k-th index may be examined (S520).

Furthermore, in the control method, whether the examined channel is in a busy state may be determined (S530).

For example, when the examined channel is in the busy state, k may be increased to k+1 (S540), and a channel corresponding to an idle bank with a (k+1)-th index may be examined (S520).

Conversely, when the examined channel is in the idle state, the idle bank with the k-th index may be selected as a memory bank targeted for a read operation or a write operation (S550).

In addition, in the control method, an access to the selected idle bank may be controlled based on signals received from an external host, to perform the read operation or the write operation (S560).

Additionally, in the control method, a result of the access may be provided to an FTL (S570). Here, the FTL may form or update a map between a physical sector and a logical sector using the result of the access.

The above-descriptions given with reference to FIGS. 1 through 4 may equally be applied to the control method according to the embodiment of the present invention. Accordingly, a further description of FIG. 5 will be omitted.

The control method for a solid state disk according to embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The invention claimed is:

1. A controller for a solid state disk comprising a plurality of memory banks, a first group of the memory banks electrically connected to a first channel and a second group of the memory banks electrically connected to a second channel, the first and second channels being independently operable, the controller comprising:
   a storage module to store an index of at least one idle bank among the plurality of memory banks, the index storing a state of a channel electrically connected to the at least one idle bank; and
   a control module to control an access to the at least one idle bank using the index, wherein the access to the at least one idle bank is based on the state of the channel electrically connected to the at least one idle bank.

2. The controller of claim 1, wherein the control module gives an access priority to an idle bank corresponding to a channel in an idle state, among the at least one idle bank.

3. The controller of claim 1, wherein the control module controls the access to the at least one idle bank, based on a round-robin scheme for wear leveling.

4. The controller of claim 1, wherein the control module indicates the index of the at least one idle bank using a pointer, and controls the access to the idle bank corresponding to the index.

5. The controller of claim 4, wherein the pointer is used to indicate the index of the at least one idle bank based on the state of the channel that corresponds to the at least one idle bank.

6. The controller of claim 4, wherein the pointer is used to indicate the index of the at least one idle bank based on a round-robin scheme for wear leveling.

7. The controller of claim 1, wherein a result of the access to the at least one idle bank is provided to a Flash Translation Layer (FTL), and the FTL forms a map between a physical sector and a logical sector based on the result of the access.

8. The controller of claim 1, wherein the storage module updates the index of the at least one idle bank, in response to a change of the state of the at least one idle bank to a busy state.

9. The controller of claim 1, wherein the storage module stores the index of the at least one idle bank using a register.

10. The controller of claim 1, wherein a flash memory is installed in each of the plurality of memory banks.

11. The controller of claim 1, wherein each of the plurality of memory banks is connected to one of a plurality of channels, and the plurality of channels are independent with each other.

12. A control method for a solid state disk comprising a plurality of memory banks, a first group of the memory banks electrically connected to a first channel and a second group of the memory banks electrically connected to a second channel, the first and second channels being independently operable, the control method comprising:
    storing, in a prepared register, an index of at least one idle bank among the plurality of memory banks;
    detecting the index from the prepared register, the at least one index being based on a state of a channel electrically connected to the at least one idle bank; and
    controlling an access to the at least one idle bank using the detected at least one index.

13. The control method of claim 12, further comprising:
    giving an access priority to an idle bank corresponding to a channel in an idle state among the at least one idle bank,
    wherein the detecting comprises detecting the index based on the given access priority.

14. The control method of claim 12, wherein the detecting comprises detecting the index based on a round-robin scheme for wear leveling.

15. The control method of claim 12, further comprising:
    providing a result of the access to the at least one idle bank to a Flash Translation Layer (FTL), wherein the FTL forms a map between a physical sector and a logical sector based on the result of the access.

16. The control method of claim 12, wherein the storing comprises updating the index of the at least one idle bank, in response to a change of the state of the at least one idle bank to a busy state.

17. A non-transitory computer readable medium storing a program to cause a computer to implement the method of claim 12.

* * * * *